(No Model.) 3 Sheets—Sheet 1.

F. W. RUNGE.
SPRING BALANCE COUNTER SCALE.

No. 289,450. Patented Dec. 4, 1883.

WITNESSES.
Wilmer Bradford
A. R. Brown

INVENTOR.
Frederick W. Runge
By C. W. M. Smith
Attorney

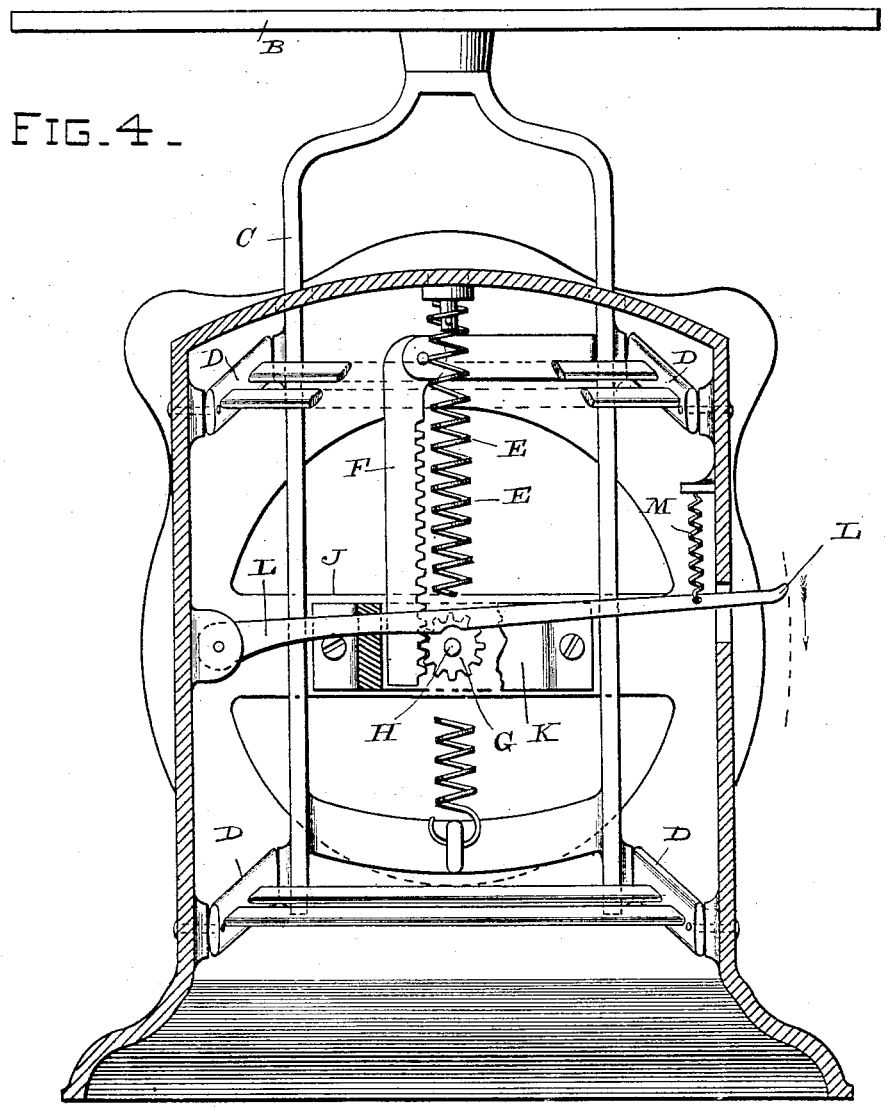

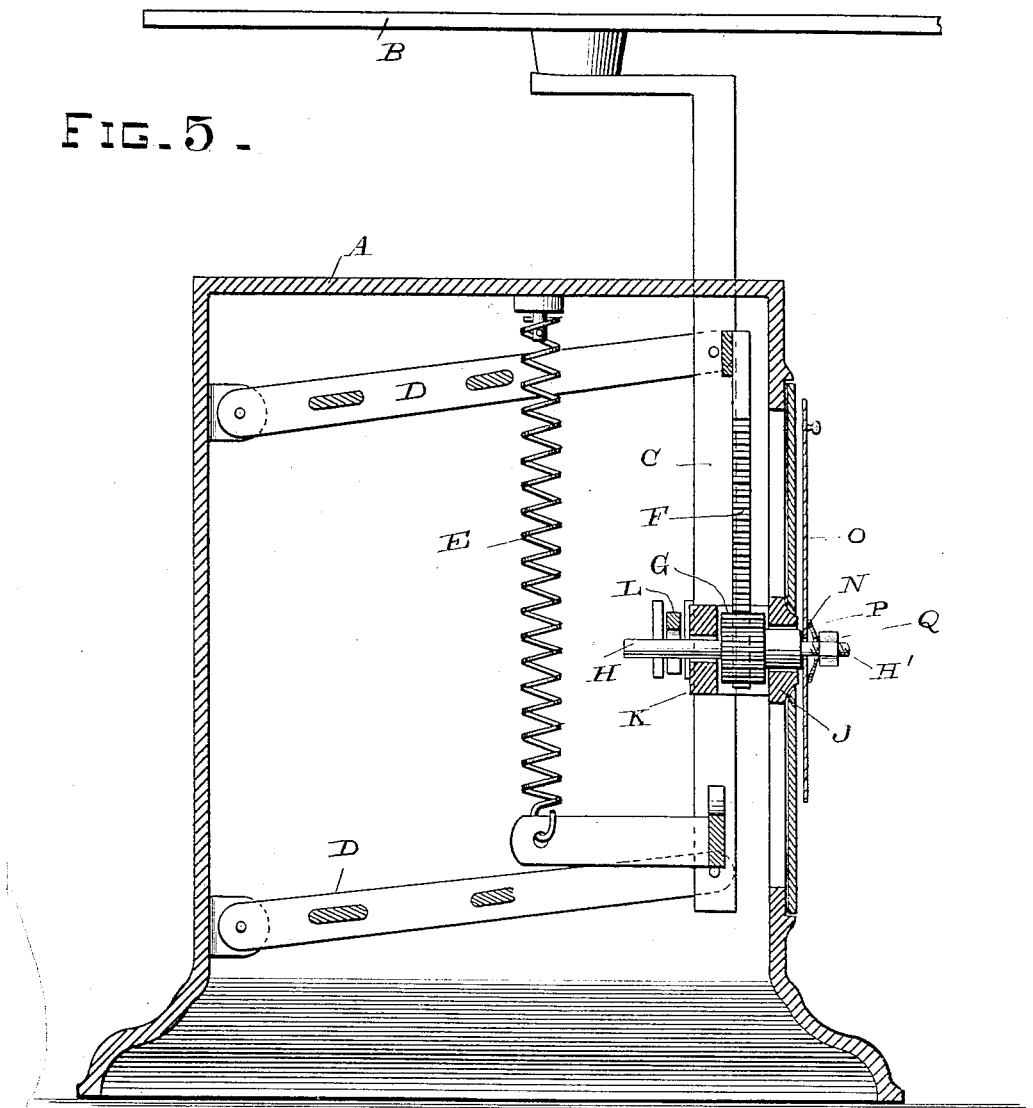

United States Patent Office.

FREDERICK W. RUNGE, OF SAN FRANCISCO, CALIFORNIA.

SPRING-BALANCE COUNTER-SCALE.

SPECIFICATION forming part of Letters Patent No. 289,450, dated December 4, 1883.

Application filed July 31, 1883. (No model.)

*To all whom it may concern:*

Be it known that I, FREDERICK W. RUNGE, a citizen of the United States, residing at San Francisco, in the county of San Francisco and State of California, have invented certain new and useful Improvements in Spring-Balance Counter-Scales, of which the following is a specification.

My invention relates to improvements in that class of spring-balance scales in which an interior rod furnished with a rack is employed to rotate a pinion upon the arbor of an index-finger which traverses a circular dial on the outer case.

Heretofore considerable difficulty has been experienced in retailing and weighing such commodities as are usually sold in a liquid state, and by weight, owing to the dissimilar weight of the containing-vessels within which such commodities were poured, and which are usually brought and carried away by the purchaser—such as pitchers and cans for containing molasses and beer—the practice usually being for the salesman to first weigh the receptacle, and then pour into it a certain quantity of the article being sold until the index-finger indicated a certain figure, which represented the combined weight of the receptacle and the desired quantity (by weight) of the product sold. This process necessitates an arithmetical calculation, which is tedious and taxing to the memory; hence the object of my invention is to overcome these objections and provide a spring-scale with a means whereby the index-finger may be moved back to the zero-point after the weight of the empty receptacle has been taken, whether it be great or little, and when filled the position of the index-finger will indicate the exact weight of the liquid without regard to the weight of its containing-vessel. I attain this object by the mechanism illustrated in the accompanying drawings, in which—

Figure 1:
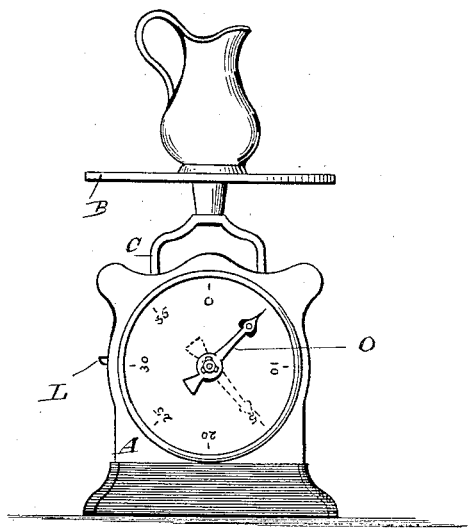
Figure 2:
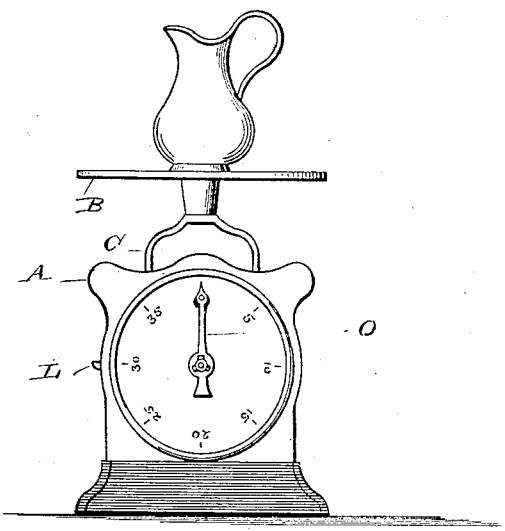
Figure 3:
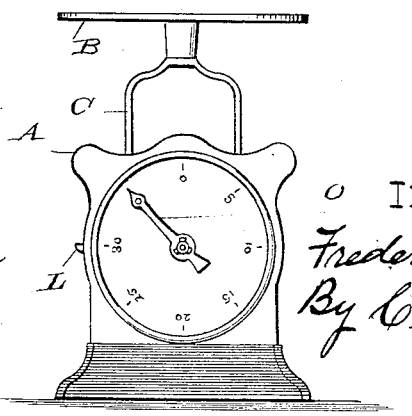

Figures 1, 2, and 3 are front elevations of a spring-balance counter-scale having my improvement attached, and representing the different positions of the index-finger during the process of weighing. Fig. 4 is a rear view of the scale with the back plate removed, and showing the interior mechanism. Fig. 5 is a vertical longitudinal section of the same.

Similar letters of reference are used to indicate like parts throughout the several views.

The scales are constructed much in the usual manner, as will be seen from the accompanying drawings, in which A represents the casing; B, the platform; C, the platform-supporting rods; D, the hinge-rods, and E the coiled spring, which operates in the usual manner.

F is the toothed bar or rack, attached to the platform-rods and meshing with the pinion G upon the arbor of the index-finger. The arbor H is provided with a pinion-wheel, G, which is either shrunk upon the arbor or made integral with it, and the said arbor or shaft is journaled in bearings formed in the front plate, J, and in a clip, K, which is bolted to the front plate, and as the pinion is snugly fitted within the space between the front plate and the clip it will be seen that end movement of the arbor is prevented. The rear end of the arbor is projected some distance beyond the retaining-clip, and it is upon this extended portion that the brake-rod L, pivoted to the side of the casing, and held up out of contact with the said arbor by a spring, M, may be pressed down upon when so desired, and for a purpose to be hereinafter mentioned. The front portion of the arbor is provided with a shoulder, N, which projects a slight distance beyond the front plate of the casing, and also with a screw-threaded reduced portion, H′, over which the index-finger O is passed, and is clamped down upon the shoulder N by means of a spring-washer, P, and nut Q, as clearly shown in Fig. 5, and thus the index-finger is permitted to rotate with the revolution of its arbor and without binding upon the dial-plate.

The operation of the device will be as follows, to wit: Let it be supposed that the index-finger stands at the zero-point. Now, when the vessel for containing the article to be weighed is placed upon the platform of the scales, the index-finger will move forward and indicate the weight of the said vessel—say five pounds. The operator now presses down upon the extended portion of the brake-rod, causing it to tightly bind the arbor or shaft of the pinion and prevent rotation of the same, while the operator moves backward the point of the index-finger until it again stands at the zero-point, as seen in Fig. 2, when the pressure upon the brake-rod is removed. The liquid being weighed is then poured into the vessel until the index-finger indicates the exact quantity desired—say fifteen pounds—as indicated by dotted lines in Fig. 1.

When the vessel and its contents are removed from the scales, the index-finger will move backward past the zero-point, as seen in Fig. 3, and in order to place it back at the zero-point the brake must be again applied to the pinion-shaft and the index-finger moved forward to the desired point.

Having thus described my invention, what I claim, and desire to secure by Letters Patent, is—

1. In a spring-balance counter-scale, the arbor or pinion-shaft H, carrying an index-finger adapted to be rotated independently of the said arbor H, and brake-bar L, combined and arranged to operate substantially in the manner and for the purpose set forth.

2. In a spring-balance counter-scale, the combination, with the arbor or pinion-shaft H and means for rotating said shaft, of the index or finger O, mounted on said shaft and adapted to be rotated independently thereof, and the brake-bar L, for holding the said pinion-shaft while the index is being adjusted, substantially as described.

In testimony that I claim the foregoing I have hereunto set my hand and seal.

FREDERICK W. RUNGE. [L. S.]

Witnesses:
WILMER BRADFORD,
CHAS. E. KELLY.